United States Patent
Chan et al.

(10) Patent No.: US 10,742,954 B2
(45) Date of Patent: Aug. 11, 2020

(54) MULTI-OVERLAY VARIABLE SUPPORT AND ORDER KERNEL-BASED REPRESENTATION FOR IMAGE DEFORMATION AND VIEW SYNTHESIS

(71) Applicant: VERSITECH LIMITED, Hong Kong (CN)

(72) Inventors: Shing Chow Chan, Hong Kong (CN); Ho Chun Wu, Hong Kong (CN)

(73) Assignee: VERSITECH LIMITED, Hong Kong (CN)

( * ) Notice: Subject to any disclaimer, the term of this patent is extended or adjusted under 35 U.S.C. 154(b) by 0 days.

(21) Appl. No.: 15/748,503

(22) PCT Filed: Aug. 1, 2016

(86) PCT No.: PCT/CN2016/092704
§ 371 (c)(1),
(2) Date: Jan. 29, 2018

(87) PCT Pub. No.: WO2017/020806
PCT Pub. Date: Feb. 9, 2017

(65) Prior Publication Data
US 2019/0273903 A1    Sep. 5, 2019

Related U.S. Application Data

(60) Provisional application No. 62/199,702, filed on Jul. 31, 2015.

(51) Int. Cl.
*H04N 13/128* (2018.01)
*H04N 21/488* (2011.01)
(Continued)

(52) U.S. Cl.
CPC ......... *H04N 13/161* (2018.05); *H04N 13/111* (2018.05); *H04N 13/128* (2018.05); *H04N 21/488* (2013.01); *H04N 2013/0085* (2013.01)

(58) Field of Classification Search
CPC ............................ H04N 13/161; H04N 13/128
See application file for complete search history.

(56) References Cited

U.S. PATENT DOCUMENTS 8,284,319 B2 * 10/2012 Lancieri ............... G06F 16/785
                                                       348/700
8,447,114 B2 *  5/2013 Watanabe ............ G06K 9/6202
                                                       382/159
(Continued)

FOREIGN PATENT DOCUMENTS

| CN | 1274439 A | 11/2000 |
| CN | 101587586 A | 11/2009 |
| EP | 1014257 A1 | 6/2000 |

OTHER PUBLICATIONS

International Search Report in corresponding PCT Application No. PCT/CN2016/092704, dated Oct. 27, 2016.
(Continued)

*Primary Examiner* — Irfan Habib
(74) *Attorney, Agent, or Firm* — Leason Ellis LLP

(57) ABSTRACT

A technique for displaying 3D videos creates a representation of image deformation, such as depth maps, in terms of a function for overlaying kernels with variable support and order. By optimizing the kernel type, order and support, which are allowed to be varied across different region of the deformation, it is able to approximate the image deformations in terms of the kernel parameters. Since the number of kernel parameters is usually much smaller than that of the number of pixels, this allows a significant reduction in the storage size of the image deformation.

17 Claims, 9 Drawing Sheets a) Conventional Image Domain Warping b) Proposed Kernel Representation

(51) Int. Cl.
*H04N 13/111* (2018.01)
*H04N 13/161* (2018.01)
*H04N 13/00* (2018.01)

(56) References Cited

U.S. PATENT DOCUMENTS

| | | | | |
|---|---|---|---|---|
| 8,676,725 | B1* | 3/2014 | Lin | G06N 20/00 |
| | | | | 706/12 |
| 9,076,075 | B2* | 7/2015 | Thouy | G06K 9/00335 |
| 9,819,974 | B2* | 11/2017 | Kunkel | H04N 21/2353 |
| 10,097,851 | B2* | 10/2018 | Lee | H04N 19/513 |
| 2007/0071100 | A1* | 3/2007 | Shi | H04N 7/0137 |
| | | | | 375/240.16 |
| 2007/0217676 | A1* | 9/2007 | Grauman | G06K 9/4671 |
| | | | | 382/170 |
| 2012/0249572 | A1* | 10/2012 | Yoshimura | H04N 21/4312 |
| | | | | 345/592 |
| 2013/0057644 | A1* | 3/2013 | Stefanoski | G06T 5/50 |
| | | | | 348/42 |

OTHER PUBLICATIONS

N. Stefanoski, O. Wang, M. Lang et. al., "Automatic view synthesis by Image-Domain-Warping," IEEE Transactions on Image Processing, vol. 22, No. 9, pp. 3329-3341, Sep. 2013.
P. Kauff, N. Atzpadin, C. Fehn, et. al., "Depth map creation and image-based rendering for advanced 3DTV services providing interoperability and scalability," Signal Processing: Image Communication, vol. 22, No. 2, pp. 217-234, Feb. 2007.
B. F. Coll, F. Ishtiaq and K. O'Connell, "3DTV at home: Status, challenges and solutions for delivering a high quality experience" in Proceedings VPQM, 2010.

* cited by examiner

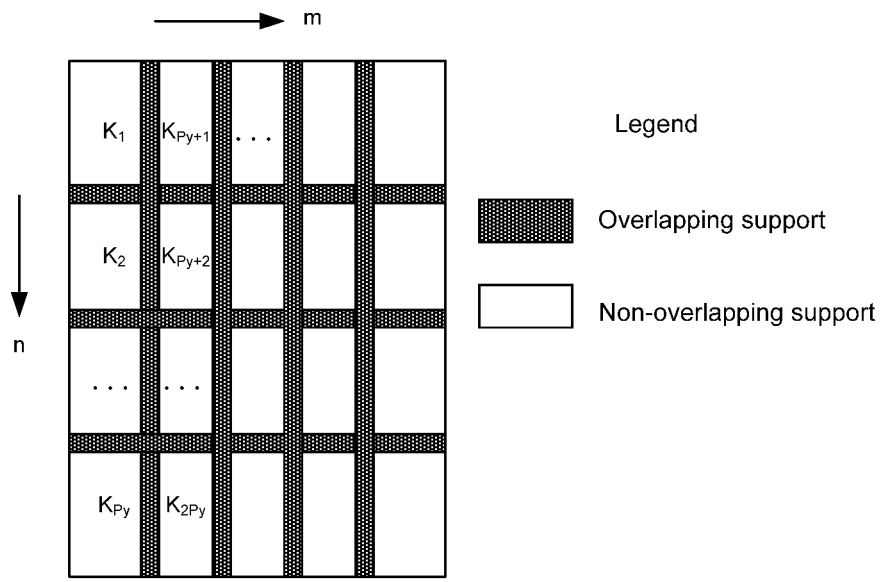
Fig. 2a. Support of Kernel Representation in a column major ordering.
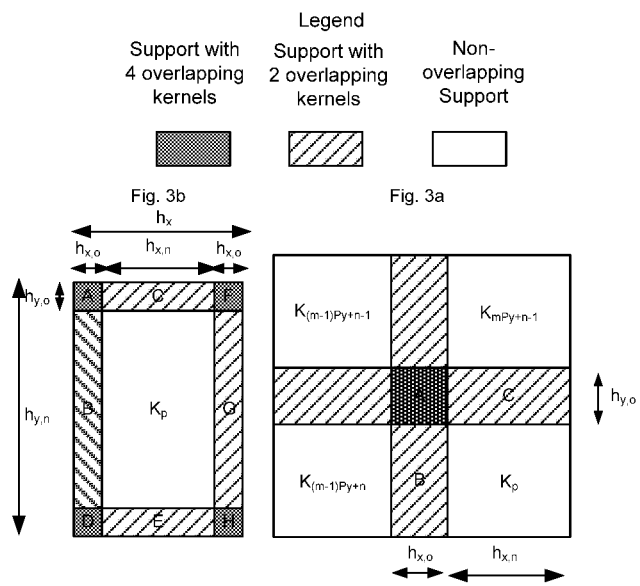
Fig. 2b. Overlapping regions of the kernels.

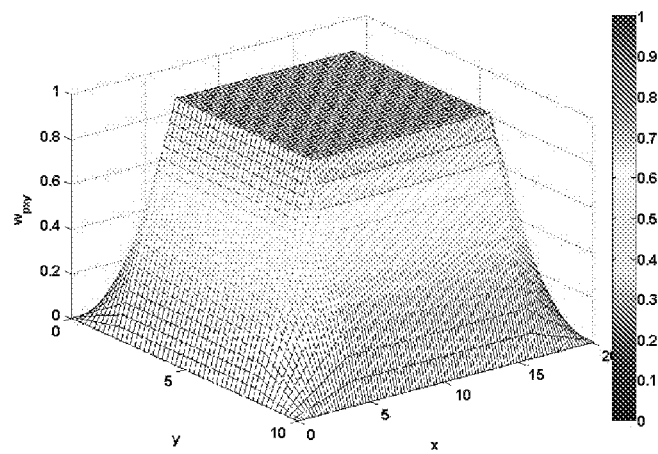
Fig. 3a. Three-dimesional plot of weighing factor for $K_p$
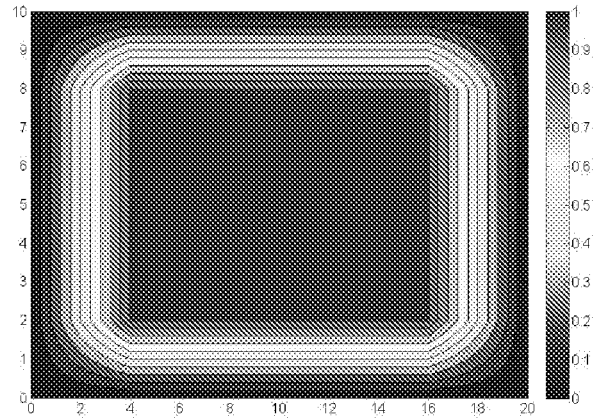
Fig. 3b. Contour plot of weighing factor for $K_p$.

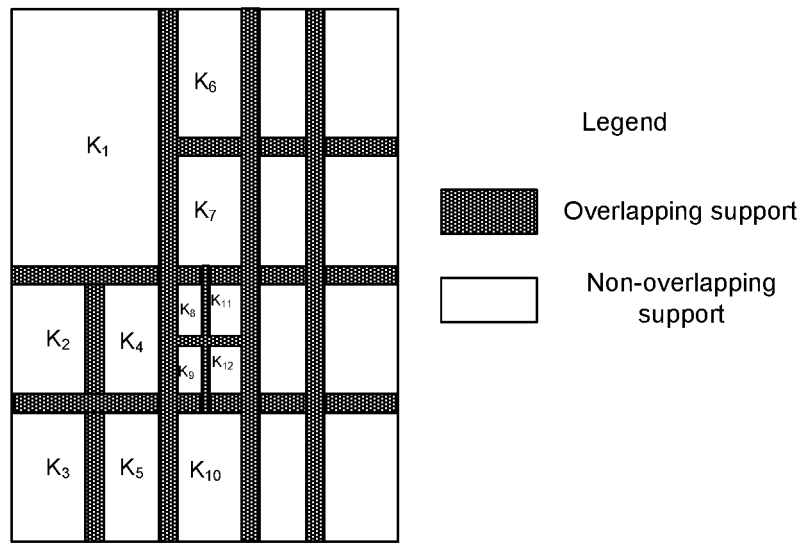
Fig. 4a. Variable Support of Kernel Representation (Vertical Split/Merge mode).
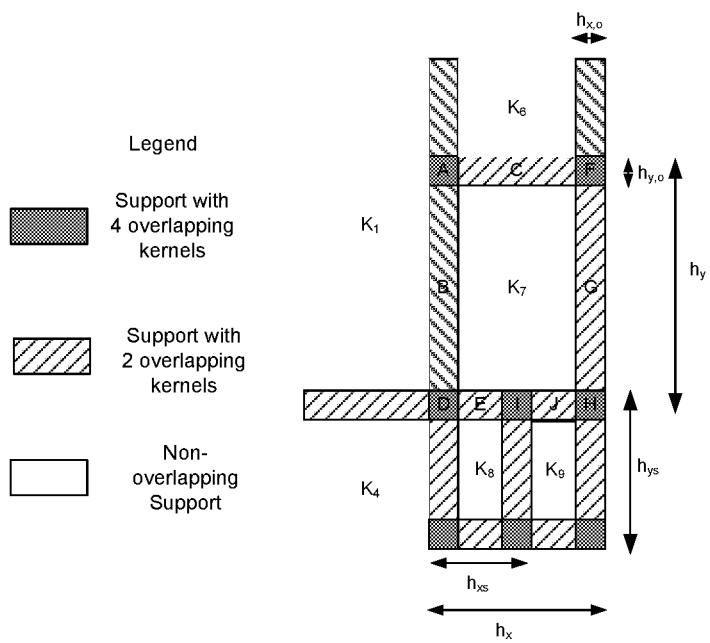
Fig. 4b. Overlapping region of the kernels.

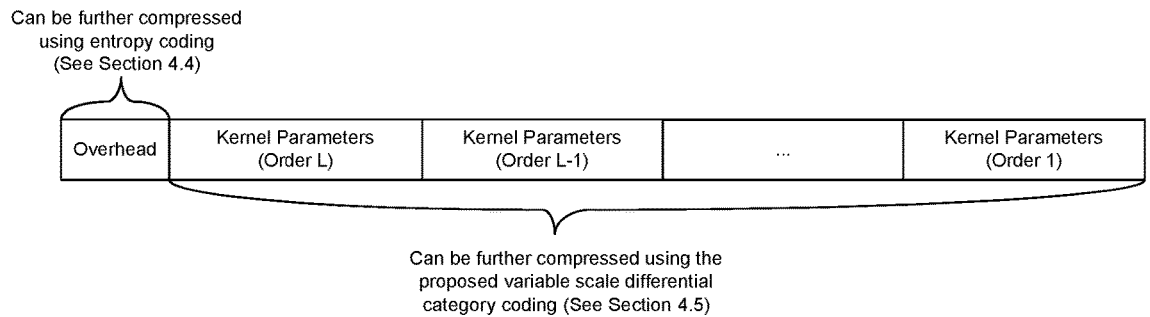
Fig. 5. Data Structure of Kernel Representation.
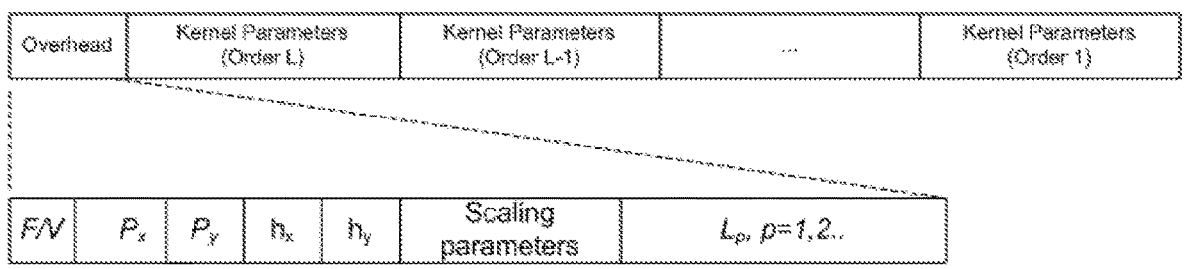
Fig. 6. Data Structure of Kernel Representation with fixed support.

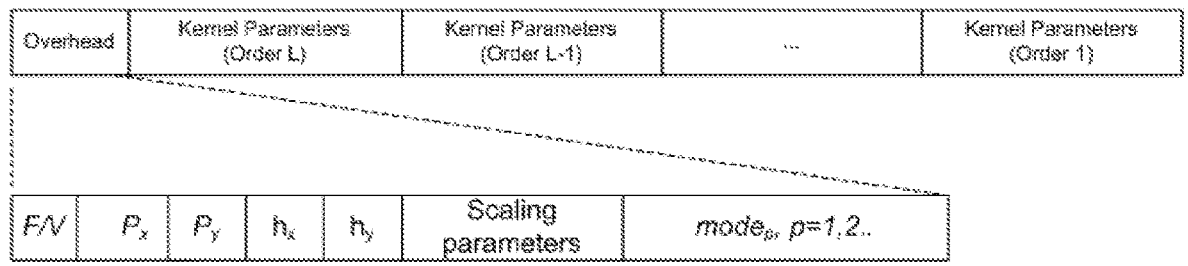
Fig. 7. Data Structure of Kernel Representation with variable support
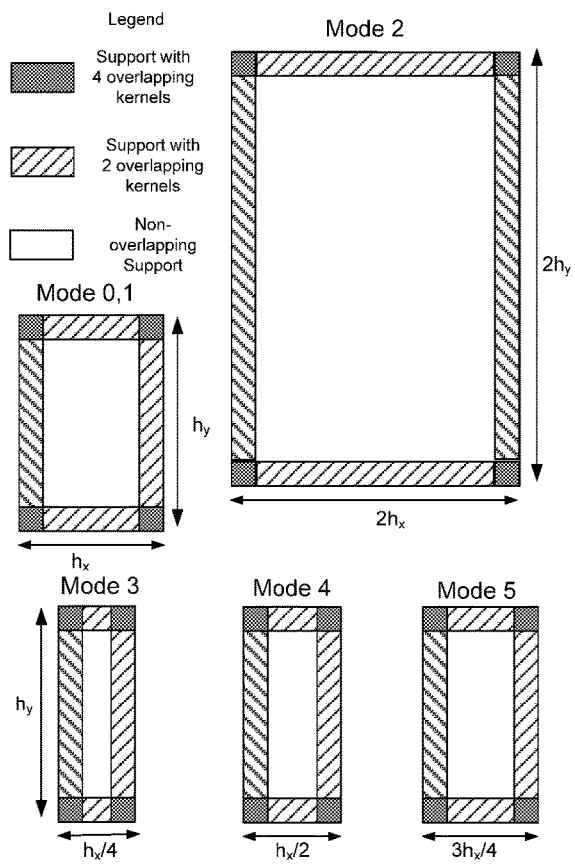
Fig. 8a. Vertical split/merge variable support.

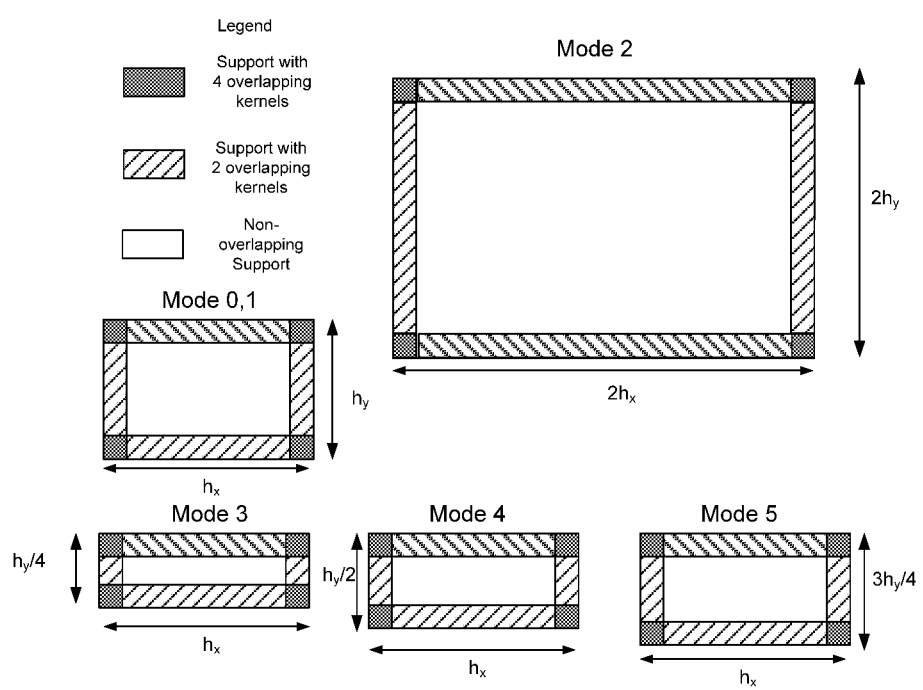
Fig. 8b. Horizontal Vertical split/merge variable support.

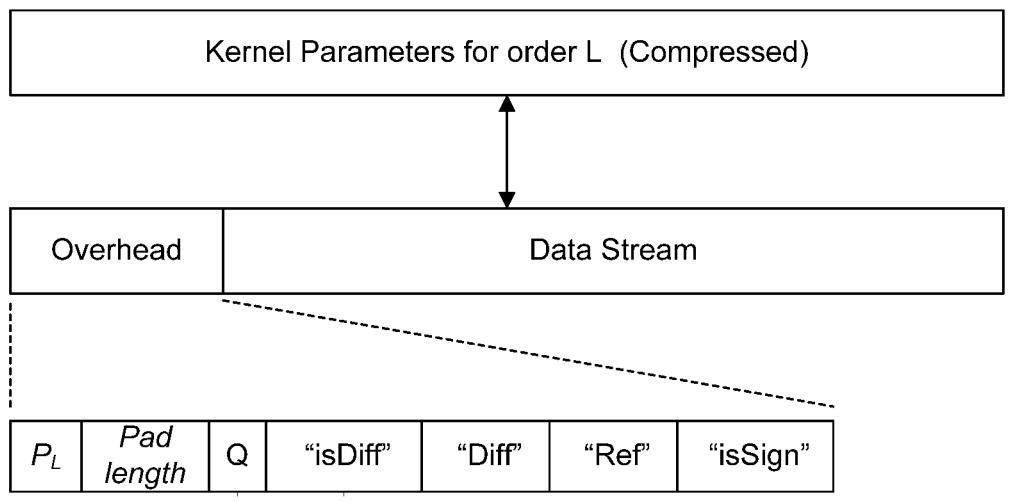
Fig. 10. Data structure for the Differential Category Coding.

MULTI-OVERLAY VARIABLE SUPPORT AND ORDER KERNEL-BASED REPRESENTATION FOR IMAGE DEFORMATION AND VIEW SYNTHESIS

CROSS-REFERENCE TO RELATED PATENT APPLICATIONS

This application is a U.S. National Phase Application under 35 U.S.C. §371 of International Patent Application No. PCT/CN2016/092704, filed Aug. 1, 2016, and claims the benefit of priority under 35 U.S.C. Section 119(e) of U.S. Application Serial No. 62/199,702, filed Jul. 31, 2015, all of which are incorporated by reference in their entireties. The International Application was published on Feb. 9, 2017 as International Publication No. WO 2017/020806 A1.

FIELD OF THE INVENTION

The invention is concerned with the representation of image deformation information in the formation, transmission and storage of three dimensional images in applications, such as image registration, video processing and view synthesis

BACKGROUND OF THE INVENTION

Most of the visual content today is still in two dimensional (2D) images or videos which are in form of a sequence of images. Generally, the conventional images and videos do not support changes of viewpoints other than just magnification/scaling or simple shifting. With the advent of stereo or three dimensional display technologies, active shutter and passive polarized eye glasses are now commonly available. More recently, high resolution autostereoscopic displays, which do not require eye glasses, have become available. The input to such autostereoscopic displays is usually i) a video plus a depth map which describes the depth of each pixel in the video or ii) a set of videos at adjacent viewpoints, sometimes called multi-view videos, which are multiplexed on an image frame in a certain format. A lenticular lens or parallax barrier of the autostereoscopic displays perform a spatial filtering so that a user at a certain viewing area will be able to see two different images at his/her left and right eyes, respectively, thus creating a 3D perception.

To display conventional 2D images or videos in a 3D display device requires the generation of another view of the scene. On the other hand, the display of 3D videos on autostereoscopic displays requires either the generation of a depth map or appropriate multi-view videos to be multiplexed in the desired frame format. One method to facilitate the generation of these additional views is to augment the videos with corresponding depth maps or its approximated versions. For conventional videos, augmenting each image frame with a depth map results in additional depth video and the format is sometimes referred to as the 2D+Z representation, where Z stands for the depth value. Afterwards, view synthesis can be performed to synthesize an arbitrary view from the 2D and depth videos. Image-domain warping is one of the methods used for view synthesis. See, United States Patent Publication No. 2013/0057644 A1 of N. Stefanoski and the article, Stefanoski et al., "Automatic view synthesis by Image-Domain-Warping," *IEEE Transactions On Image Processing*, vol. 22, no. 9, pp. 3329-3341, (September 2013), which are incorporated herein by reference in their entirety. Since the depth map is usually represented as depth values assigned to each of the pixels of the image frame, the size of the depth map and hence the depth video can be very large. Efficient compression of multi-view depth map images and videos is therefore important for their efficient storage and transmission. Moreover, since the conventional depth maps contain only one value at a particular location, the image-domain warping method may not be able to handle semi-transparent and reflective objects because the objects are matted with the background.

SUMMARY OF THE INVENTION

Motivated by the theory of approximating functions using Reproducing Kernel Hilbert Space, the present invention provides a new representation of image deformation, such as depth maps, in terms of a function of overlaying kernels with variable support and order. See, the Cheney et al. 2000 article. By optimizing the kernel type, order and support, which are allowed to be varied across different region of the deformation, it is able to approximate the image deformations in terms of the kernel parameters. Since the number of kernel parameters is usually much smaller than that of the number of pixels, this allows a significant reduction in the storage size of the image deformation. The kernel representation can also handle the overlay of different objects with large depth difference by considering multiple layers of the representation, in which the kernel representation of the occluded objects can be approximated by the inpainted data. Moreover, it is able to perform (inter-frame) and/or over space (inter-view) prediction under changes in camera position and code only the required camera compensation model and motion descriptors, which leads to further reduction in storage size.

Furthermore, the invention uses a Variable Scale and Differential Category Coding compression method for compressing the kernel parameters, which are real-valued numbers. Most of the compression algorithms focus on encoding the redundancies among integers or fixed-point numbers, such as grouping them into categories. Compressing real-valued numbers, which are usually represented using floating point notation, is usually avoided due to the sophistication in tackling the varying decimal places and the range of the floating point number. In this invention, several properties of the kernel approximation of image deformation are exploited, which allows for the delineation of a procedure to determine the required word length for representing the real-valued kernel parameters. Moreover, rather than simply predicting the values of the kernel parameters, the present invention predicts the scale and the sign of the kernel parameters and codes the scale and sign difference. This allows for the preservation of the precision and the further reduction in the storage size needed for the floating point kernel parameters, respectively, at the same time.

The invention is intended to provide an efficient representation for realizing image deformation, view synthesis or other related video/image processing applications. In the context of view synthesis and 3D video conversion, this invention helps to significantly reduce the size of the optimized image deformation to be stored, which helps to reduce the complexity in determining online these deformation, transmission bandwidth and hence the broadcast latency for the 3D video content providers. The representation can be pre-computed offline in an encoder to avoid the heavy computation in the decoder. The compact data size of the representation makes it an attractive alternative in 3-D video streaming applications, in which the bandwidth is limited.

The invention contains the following two major components:

(A) A Multi-overlay Variable Support and Order Kernel-based Representation for Image Deformation: This concept of kernel representation of the image deformation is entirely new and it has the following distinctive advantages:
  (i) The kernel representation is able to compress significantly the data size of image deformation. Moreover, when a variable support and order is chosen, the smoothness of the image deformation can be more flexibly controlled.
  (ii) Multiple of such representations can be matted together to form a multi-overlay representation. Moreover, opacity can be incorporated in each different overlay representation to support semi-transparency and reflective applications. The opacity can also be compressed using the kernel representation.
  (iii) The shape or support information of each overlaying objects can be encoded using a shape codec. It can also be used to further sharpen the deformation.
  (iv) The ability to perform inter-coding, in which a sequence of image deformations can be coded using a reference kernel representation, a global camera compensation model and motion descriptors. This can further reduce the data size of the representation.
  (v) The kernel parameters, i.e. the representation after compression, can be efficiently computed using a novel multiplier-less maximum likelihood approach, which can be executed sequentially or in parallel. As a result, this invention can be employed for real-time view synthesis in, e.g., an android-based 3D display device as it facilitates an efficient hardware implementation. It will enable the development of real-time hardware devices, such as a TV-box, for the 3D video format conversion. To further reduce the complexity, one may decimate the image deformation map before computing the kernel parameters.

(B) A Variable Scale and Differential Category Coding for Compression of Kernel Parameters. The novelties/advantages of the proposed method are summarized as follows:
  (i) The coding of the real-valued kernel parameters is new. Conventionally, one can represent real-numbers as fixed-point numbers and employ a compression algorithm, such as modified Huffman coding. Efficient coding of these numbers by prediction is usually complicated due to their large dynamic range. Unlike conventional methods, this invention is able to efficiently compress the real-valued parameters by exploring the redundancy across the scale and sign difference, which leads to an increase in compression ratio.
  (ii) The required word length can be determined by the specified compression quality. This provides high flexibility in controlling the compression ratio and the word length for hardware implementation.
  (iii) A variable scale is employed to form the category coding and a new method is used to optimize the scale and it is able to achieve a high compression ratio and good compression quality.

The novel features of the present invention include (a) concept of representing the image deformation as a function of multiple kernels, which can overlay with each other, (b) the inclusion of transparency/opacity of the overlay in the kernel representation, (c) variable support in a kernel, which can overlap or not overlap with other kernels, (d) further sharpening the reconstructed image deformation using the shape information, (e) three different schemes of variable support, (f) inter-coding for the kernel representation, (g) variable scale in category coding, (h) coding a real-valued kernel parameter by exploring the redundancy in scale and sign difference and (i) the method in choosing the variable scale.

BRIEF DESCRIPTION OF THE DRAWINGS

The present invention can be more fully understood by the following detailed description of the preferred embodiments, with reference made to the accompanying drawings, wherein:

FIG. 2a shows support of kernel representation in a column major ordering and FIG. 2b shows overlapping regions of the kernels according to the present invention;

FIG. 3a shows a three-dimensional plot of the weighing factor for $K_p$ and FIG. 3b shows a contour plot of the weighing actor for $K_p$ according to the present invention;

FIG. 4a illustrates a variable support of a kernel representation with vertical split/merge mode and FIG. 4b shows overlapping regions of the kernels according to the present invention;

FIG. 5 illustrates the data structure of a kernel representation according to the present invention;

FIG. 6 illustrates the data structure of a kernel representation with fixed support according to the present invention;

FIG. 7 illustrates the data structure of a kernel representation with variable support according to the present invention;

FIG. 8a shows a vertical split/merge variable support and FIG. 8b shows a horizontal vertical split/merge variable support according to the present invention;

FIG. 10 illustrates the data structure for differential category coding according to the present invention.

DETAILED DESCRIPTION OF EXEMPLARY EMBODIMENTS OF THE INVENTION

Mathematical Foundation

Consider a pixel i(x,y) of an image I with resolution M×N, where M is the number of pixel columns (width) and N is the number of pixel rows (height). x=1, 2, ... M and y=1, 2, . . . N are the x and y coordinates of the pixel. Conventionally, the image deformation of each pixel i(x,y) can be represented as a displacement denoted by d(x,y). They can be re-written in the matrix form $$D=[d_1, d_2, \ldots, d_M], \text{ where } d_x=[d(x,1), d(x,2), \ldots, d(x,N)]^T. \quad (1)$$

In view synthesis, the positions of the original pixel i(x,y) in the V views are computed. The new position at the v-th view is $i_v(x,y)$, where v=1, 2, ..., V. In the conventional representation of, the relationship of $i_v(x,y)$ and i(x,y) is given as $$i_v(x,y)=\phi(x,y,v)=\phi(i(x,y),d(x,y),v), \quad (2)$$

where $\phi(\bullet)$ is a synthesis function that modifies the position of i(x,y) to synthesize the v-th view of I. See the Stefanoski article and the article Kauff et al., "Depth map creation and image-based rendering for advanced 3DTV services providing interoperability and scalability," *Signal Processing: Image Communication*, vol. 22, no. 2, pp. 217-234, February 2007, which is incorporated herein by reference in its entirety. For example, in generating two views from the image I and its deformation map D, i.e. v=1, 2, φ(•) can be chosen as $$\phi(i(x,y), d(x,y), v) = \begin{cases} i(x,y) - d(x,y)/2 & v = 1 \\ i(x,y) + d(x,y)/2 & \text{otherwise} \end{cases}.$$

In general, the synthesis function φ(•) can be a non-linear function of i(x,y), d(x,y) and v.

Suppose the bit per pixel of the image deformation matrix D is 8, the data rate of D for a 1080p 30 frame per second video is data rate=(bit per pixel×frame per second×M×N)/$10^6$=(8×30×1920×1080)/$10^6$=497 Mbps. Such a high data rate is undesirable for many applications. Moreover, a major limitation of conventional approaches is that there is no overlay. Consequently, it cannot support semi-transparent and reflective objects. In order to overcome this problem, a novel kernel representation is proposed for image deformation, in which the kernels can overlay with each other to provide for occlusion and matting of objects.

Figure 1:
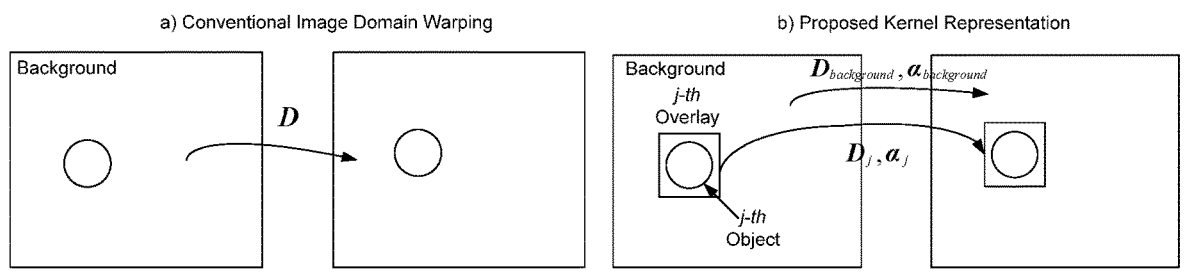
FIG. 1a is an overview of conventional image domain warping and FIG. 1b is an overview of a kernel representation for view synthesis according of the present invention.

FIG. 1. An overview of the proposed kernel representation for view synthesis. Each of the overlays, which can be semi-transparent, contains a deformation map $D_j$ and opacity $\alpha_j$. Each of these quantities can be represented using a kernel representation with an arbitrary support. The degree of transparency and opacity can also be represented similarly using the kernel representation. The shape of the object can be further encoded using a shape codec and it can be used to further used to sharpen the image deformation of the object.

The image deformation of the objects and the background are assigned to different overlays, each of which contains the deformation d(x,y) and the degree of transparency α(x,y). This provides the flexibility for the user to choose whether to show the overlay or the occluded objects hidden by the overlay. The shape of each object can be further compressed using a shape codec and this shape information can be further used to sharpen the image deformation of the object. Both the image deformation d(x,y) and the transparency α(x,y) can be represented by a function of different kernels, a.k.a. approximation functions in reproducing kernel Hilbert spaces. See, E. W. Cheney et al., *A course in approximation theory*, Brooks, (2000), which is incorporated herein by reference in its entirety. First, the objects in the foreground have to be segmented from the image deformation, e.g., using some clustering algorithms. Afterwards, the image deformation at each of the objects is represented by a different overlay of kernel representation. Finally, the remaining background is represented by another layer of kernel representation. More precisely, suppose there are J objects and the background in an image. The image deformation map D can be decomposed into J+1 overlays, i.e. $D_j$, j=1, 2, ..., J+1, where the first J overlays represent the objects and the J+1-th overlay represents the background, each of which is associated with a transparency or opacity value $\alpha_j$. Let $d_j(x,y)$ and $\alpha_j(x,y)$ be the (x,y)-th element of $D_j$ and $\alpha_j$ respectively. In order to compress the data size of $D_j$, $D_j$ is approximated as a function of different kernels, e.g., a linear combination, which is given as $$d_j(x,y) \approx f_j(K_{1,j}(a_{1,j}), K_{2,j}(a_{2,j}), \ldots, K_{P,j}(a_{P,j})) = \qquad (3a)$$
$$\sum_{p=1}^{P_j} w_{p,x,y,j} K_{p,j}\left(\frac{x - c_{x,p,j}}{h_{x,p,j}}, \frac{y - c_{y,p,j}}{h_{y,p,j}}, a_{p,j}\right),$$

-continued
$$a_j(x,y) \approx f_{\alpha,j}(K_{1,j}(a_{1,k}), K_{2,j}(a_{2,j}), \ldots, K_{P,j}(a_{P,j})) = \qquad (3b)$$
$$\sum_{p=1}^{P_j} w_{\alpha,p,x,y,j} K_{p,j}\left(\frac{x - c_{x,p,j}}{h_{x,p,j}}, \frac{y - c_{y,p,j}}{h_{y,p,j}}, a_{\alpha,p,j}\right),$$

where $f_j(K_{1,j}(a_{1,j}), K_{2,j}(a_{2,j}), \ldots, K_{P,j}(a_{P,j}))$ is a function of $K_{p,j}(x,y,a_{p,j})$ to approximate $d_j(x,y)$ and $K_{p,j}(x,y,a_{p,j})$ is the p-th kernel function for the j-th layer, $c_{x,p,j}$ and $c_{y,p,j}$ are the centering parameters associated with the p-th kernel. $w_{p,x,y}$ is the weight of the kernel. $P_j$ is the number of kernels. $h_{x,p,j}$ and $h_{y,p,j}$ are the bandwidths of the kernel. $a_{p,j}$ and $a_{\alpha,p,j}$ are the kernel parameters of the image deformation and the transparency/opacity and they can be computed using a parameter estimation method, such as the distributed maximum likelihood method (DMLE) described in sub-section C. Hence, the synthesis function in equation (2) can be re-written as $$i_{v,j}(x,y) = \phi'(x,y,d_j(x,y),v), \text{ and} \qquad (4a)$$

$$i_v(x,y) = \sum_{j=1}^{J} i_{v,j}(x,y) = \sum_{j=1}^{J} \alpha_j(x,y,j,v), \qquad (4b)$$

where $d_j(x,y)$ and $\alpha_j(x,y)$ can be approximated as in equation (3). Unlike the view synthesis that employs the conventional representation as in equation (2), which requires storage of all the image deformation values d(x,y) for constructing the synthesis function, the proposed kernel representation allows the construction of the synthesis function using only a few kernel parameters, the number of which is much smaller than the size of the image deformation D. As a result, the data rate can be reduced. For notation convenience, the approximation of j-th overlay of the image deformation $d_j(x,y)$ is retained and the index j in the remaining sections is omitted. The transparency/opacity $\alpha_j(x,y)$ can also be approximated similarly. Different kernels $K_p(x,y,a_p)$ can be chosen, such as uniform, polynomial, triangular, spline, Epanechnikov, Logistic kernels, etc. In particular, when $K_p(x,y,a_p)$ is chosen as a polynomial kernel, it can be written as $$K_p(x,y,a_p) = \qquad (5)$$
$$\begin{cases} a_{0,p} + \sum_{l=1}^{L}\sum_{k=0}^{l} \alpha_{l-k,k,p} x^{l-k} y^k & (x,y) \in Supp(K_p(x,y,a_p)) \\ 0 & \text{otherwise} \end{cases},$$

where $a_p = [a_{0,p}, a_{1,0,p}, a_{0,1,p}, a_{2,0,p}, \ldots, a_{0,L,p}]^T$ are the kernel parameters. $L_p$ is the kernel order, $a_{l,k,p}$ are the kernel parameters. The order $L_p$ is allowed to vary across different kernels p=1, 2, ..., P. If $L_p$=2, $K_p(x,y,a_p)$=$a_{0,p}$+$a_{1,0,p}$x+$a_{0,1,p}$y+$a_{2,0,p}$$x^2$+$a_{1,1,p}$xy+$a_{0,2,p}$$y^2$ if (x,y)∈supp($K_p$(x,y, $a_p$)) or 0 otherwise. supp($K_p$(x,y)) is the support of $K_p$(x,y), i.e. the region where $K_p$(x,y,$a_p$) is non-zero. The support could be in any arbitrary shape and the topological space it represents could be connected or disconnected, such as rectangles, parallelograms or polygons. The kernel can also be separable or non-separable. See the Cheney text. For example, if a rectangular support is chosen, supp $$\left(K_p\left(\frac{x - c_{x,p}}{h_{x,p}}, \frac{y - c_{y,p}}{h_{y,p}}\right)\right)$$

can be written as $$\text{supp}\left(K_p\left(\frac{x-c_{x,p}}{h_{x,p}}, \frac{y-c_{y,p}}{h_{y,p}}\right)\right) = \quad (6)$$

$$\{x \in [c_{x,p} - h_{x,p}, c_{x,p} + h_{x,p}], y \in [c_{y,p} - h_{y,p}, c_{y,p} + h_{y,p}]\}.$$

From equation (6), it can be seen that the bandwidths $h_{x,p}$ and $h_{y,p}$ are also the support of the kernel $$K_p\left(\frac{x-c_{x,p}}{h_{x,p}}, \frac{y-c_{y,p}}{h_{y,p}}\right).$$

Since the kernel order $L_p$ and the support ($h_{x,p}$ and $h_{y,p}$) are allowed to be varied for all kernels $K_p(x,y)$, $p=1, 2, \ldots, P$, this can be referred to as a kernel representation with variable order and support. The support of $$K_p\left(\frac{x-c_{x,p}}{h_{x,p}}, \frac{y-c_{y,p}}{h_{y,p}}\right)$$

in equation (6) can also be chosen to overlap with the support of the other kernels.

The weighing factor must satisfy $w_{p,x,y} \in [0,1]$. If a non-overlapping kernel representation is chosen, $w_{p,x,y}$ is chosen as $w_{p,x,y}=1$ and extra smoothing or filtering should be employed to smoothen the possible discontinuities across the kernel boundaries. Whereas in a overlapping kernel representation, $w_{p,x,y}$ is chosen as $$w_{p,x,y} = \begin{cases} 1 & x, y \in S_{p,non\_overlap} \\ \alpha(p, x, y) & x, y \in S_{p,overlap} \\ 0 & \text{otherwise} \end{cases} \quad (7)$$

where $S_{p,overlap}$ is the subset of supp $$\left(K_p\left(\frac{x-c_{x,p}}{h_{x,p}}, \frac{y-c_{y,p}}{h_{y,p}}\right)\right)$$

which overlaps with the support of other kernels. $S_{p,non\_overlap}$ is the non-overlapping subset such that $$S_{p,non\_overlap} = \text{supp}(K_p) \cap \bigcup_{i \neq p} \sim \text{supp}(K_i).$$

Hence, supp $$\left(K_p\left(\frac{x-c_{x,p}}{h_{x,p}}, \frac{y-c_{y,p}}{h_{y,p}}\right)\right) = S_{p,non\_overlap} \cup S_{p,overlap}.$$

For other regions that do not lie within the support of $K_p$, $w_{p,x,y}=0$. $\alpha(p,x,y) \in [0,1]$ is a weighing factor to allow a smooth transition of the approximated image deformation at the kernel boundaries and it is chosen in a manner that satisfies the following:

For each x, y, the sum of all weighing factor $w_{p,x,y}$ at x, y must be 1, i.e.

$$\sum_{p=1}^{P} w_{p,x,y} = 1. \quad (8)$$

In the following example of a kernel representation with a fixed support, there is an illustration of how $\alpha(p, x, y)$ can be particularly chosen.

The simplest form is a fixed support kernel with a rectangular shape with support $h_{x,p}=h_x$ and $h_{y,p}=h_y$. FIG. 1a shows the support of the kernels $$K_p\left(\frac{x-c_{x,p}}{h_{x,p}}, \frac{y-c_{y,p}}{h_{y,p}}\right),$$

$p=1, 2, \ldots, P_y, P_y+1, \ldots 2P_y, \ldots P$ in a column major ordering, i.e. the index p is expressed as $p=mP_y+n$. $c_{x,p}=\text{floor}(p/N) \times \text{floor}(M/P_x)$ and $c_{y,p}=\text{floor}(N/P_y) \times \text{mod}(p,N)$. floor( ) and mod( ) are the floor and modulo operators. In general, the kernels can also be represented in a row major ordering. FIG. 2b shows the support of four adjacent kernels extracted from FIG. 2a, in which $m \in [1,M-1]$, $n \in [1,N-1]$. Each of the kernels, i.e. $K_{(m-1)P_y+n-1}$, $K_{(m-1)P_y+n}$, $K_{mP_y+n-1}$, and $K_p$, has a horizontal support $h_x$ and a vertical support $h_y$. The overlapping regions are shown as region A, B, and C respectively. Region A contains pixels that lie in the overlap of the four kernels. Whereas in regions B and C, they are regions with two overlapping kernels. Consider the computation of kernel parameters in $K_p$, the support of which contains only region A, B, C, D, E, F, G, H and its non-overlapping region. The weighing factor of kernel $K_p$ can be chosen as $$w_{p,x,y} = \begin{cases} 1 & x, y \in S_{p,non\_overlap} \\ \alpha(p, x, y) & x, y \in S_{p,overlap} \\ 0 & \text{otherwise} \end{cases} \quad (9)$$

where $\alpha(p, x, y)$ are chosen as

Region A:

$$\alpha(p, x, y) = \left(\frac{x-c_{x,p}}{h_{x,o}}\right)\left(\frac{y-c_{y,p}}{h_{y,o}}\right) \quad (10a)$$

Region B:

$$\alpha(p, x, y) = \left(\frac{x-c_{x,p}}{h_{x,o}}\right), \quad (10b)$$

Region C:

$$\alpha(p, x, y) = \left(\frac{y-c_{y,p}}{h_{y,o}}\right), \quad (10c)$$

Region D:
$$\alpha(p, x, y) = \left(\frac{x - c_{x,p}}{h_{x,o}}\right)\left(1 - \frac{y - (c_{y,p} + h_y - h_{y,o})}{h_{y,o}}\right), \quad (10d)$$

Region E:
$$\alpha(p, x, y) = 1 - \left(\frac{y - (c_{y,p} + h_y - h_{y,o})}{h_{y,o}}\right), \quad (10e)$$

Region F:
$$\alpha(p, x, y) = \left(1 - \frac{x - (c_{x,p} + h_x - h_{x,o})}{h_{x,o}}\right)\left(\frac{y - c_{y,p}}{h_{y,o}}\right), \quad (10f)$$

Region G:
$$\alpha(p, x, y) = 1 - \left(\frac{x - (c_{x,p} + h_x - h_{x,o})}{h_{x,o}}\right), \quad (10g)$$

Region H:
$$\alpha(p, x, y) = \left(1 - \frac{x - (c_{x,p} + h_x - h_{x,o})}{h_{x,o}}\right)\left(1 - \frac{y - (c_{y,p} + h_y - h_{y,o})}{h_{y,o}}\right). \quad (10h)$$

FIGS. 3a and 3b show a three-dimensional and contour plot of the weighing factor for $K_p$ respectively. It can be shown that all the weighing factors $$\sum_{p=1}^{P} w_{p,x,y}$$

sum to 1 for all overlapping regions A to H. For example, at region A, $$\sum_{p=1}^{P} = w_{p,x,y} + w_{p-P_y,x,y} + w_{p-1,x,y} + w_{p-P_y-1,x,y}$$
$$= \alpha(p, x, y) + \alpha(p, x - h_x, y) + \alpha(p, x, y - h_y) + \alpha(p, x - h_x, y - h_y)$$
$$= \left(\frac{x - c_{x,p}}{h_{x,o}}\right)\left(\frac{y - c_{y,p}}{h_{y,o}}\right) + \left(1 - \frac{x - c_{x,p}}{h_{x,o}}\right)\left(\frac{y - c_{y,p}}{h_{y,o}}\right) +$$
$$\left(\frac{x - c_{x,p}}{h_{x,o}}\right)\left(1 - \frac{y - c_{y,p}}{h_{y,o}}\right) + \left(1 - \frac{x - c_{x,p}}{h_{x,o}}\right)\left(1 - \frac{x - c_{y,p}}{h_{y,o}}\right) = 1.$$

The weighing factor can be chosen similarly in a manner that it satisfies $$\sum_{p=1}^{P} w_{p,x,y} = 1.$$

Consider a kernel representation with variable support shown in FIGS. 4a and 4b. From FIG. 4a, the horizontal and vertical support of $K_1$ are $2h_x$ and $2h_y$ respectively. Whereas for $K_2$ to $K_7$, and $K_{10}$, the supports are $h_x$ and $h_y$. For $K_8$, $K_9$, $K_{11}$, and $K_{12}$, the supports are $h_{xx}$ and $h_{ys}$. Consider the overlapping regions of $K_7$, as shown in FIG. 3b. The same weighing factors $w_{p,x,y}$ for regions A to H can be chosen as in equation (10). For region I and J, $w_{p,x,y}$ should be chosen as the weighing factor in region E, i.e.

$$\alpha(p, x, y) = 1 - \left(\frac{y - (c_{y,p} + h_y - h_{y,o})}{h_{y,o}}\right).$$

For $K_1$, the same $w_{p,x,y}$ should be chosen in region A and B, i.e.

$$\alpha(p, x, y) = 1 - \left(\frac{x - (c_{x,p} + h_x - h_{x,o})}{h_{x,o}}\right).$$

because they lay on the right edge of $K_1$. It can be shown that these chosen $w_{p,x,y}$ will also satisfy the condition $$\sum_{p=1}^{P} w_{p,x,y} = 1.$$

For example, in region A, $$\sum_{p=1}^{P} w_{p,x,y} = w_{7,x,y} + w_{1,x,y} + w_{6,x,y} = \left(\frac{x - c_{x,7}}{h_{x,o}}\right)\left(\frac{y - c_{y,7}}{h_{y,o}}\right) + \quad (12)$$
$$\left(1 - \frac{x - c_{x,7}}{h_{x,o}}\right) +$$
$$\left(\frac{x - c_{x,7}}{h_{x,o}}\right)\left(1 - \frac{y - c_{y,7}}{h_{y,o}}\right)$$
$$= \left(\frac{x - c_{x,7}}{h_{x,o}}\right)$$
$$\left(\frac{y - c_{y,7}}{h_{y,o}} + 1 - \frac{y - c_{y,7}}{h_{y,o}}\right) +$$
$$\left(1 - \frac{x - c_{x,7}}{h_{x,o}}\right)$$
$$= \left(\frac{x - c_{x,7}}{h_{x,o}}\right) + \left(1 - \frac{x - c_{x,7}}{h_{x,o}}\right) = 1.$$

The kernel parameters can be estimated using a distributed maximum likelihood estimation (MMLE) approach. In general, the kernel parameters can be obtained from a parameter estimation method. A multiplier-less maximum likelihood estimation (MMLE) approach is used and the kernel representation in equation (4) can be re-written as $$d(x, y) = \sum_{p=1}^{P} w_{p,x,y} K_p\left(\frac{x - c_{x,p}}{h_{x,p}}, \frac{y - c_{y,p}}{h_{y,p}}, a_p\right) + e(x, y | a_p), \quad (13)$$

where $e(x,y|a_p)$ is the approximation error at the pixel at position (x,y) given the parameters $a_p$. A maximum likelihood estimator can be used to obtain $a_p$, which is given as $$\max(L(a_p)) = \max\left(\prod_{x,y} p(e(x, y \mid a_p))\right), \quad (14)$$

where $p(e(x,y|a_p))$ is the probability density function of $e(x,y)$. For example, if the error $e(x,y)$ is modeled using a Gaussian model with zero mean and variance $\sigma^2$, i.e. $e(x,y) \sim N(0,\sigma^2)$, the probability density function (pdf) of $e(x,y)$ can be written as $$p(e(x, y \mid a_p)) = \frac{1}{\sqrt{2\pi\sigma^2}} \quad (15)$$

$$\exp\left(\frac{-1}{2\sigma^2}\left(d(x, y) - \sum_{p=1}^{P} w_{p,x,y} K_p\left(\frac{x - c_{x,p}}{h_{x,p}}, \frac{y - c_{y,p}}{h_{y,p}}, a_p\right)\right)^2\right).$$

The likelihood function of $a_p$, denoted by $L(a_p)$ is given as $$L(a_p) = \prod_{x,y} p\left(e(x, y \mid a_p)\right) = \quad (16)$$

$$(2\pi\sigma^2)^{-MN/2} \prod_{x,y} \exp\left(\frac{-1}{2\sigma^2}\left(d(x, y) - \sum_{p=1}^{P} w_{p,x,y} K_p\left(\frac{x - c_{x,p}}{h_{x,p}}, \frac{y - c_{y,p}}{h_{y,p}}, a_p\right)\right)^2\right).$$

The solution to equation (16) is

For $p=1,2,\ldots,P$, $a_p = (\Phi_p^T W_p^2 \Phi_p)^{-1} \Phi_p^T W_p^2 d_p$. (17)

The iteration can be executed sequentially or in parallel. For a limited choice of $h_{x,p}$ and $h_{x,p}$, the matrices $(\Phi_p^T W_p^2 \Phi_p)^{-1}$ and $\Phi_p^T W_p^2$ are fixed and can be pre-computed offline and the computation of $a_p$ can be implemented in a multiplier-less manner. For example, in the variable support schemes proposed, the matrix $(\Phi_p^T W_p^2 \Phi_p)^{-1}$ can be pre-computed for each of the modes in equation (27). To further reduce the complexity, the image deformation map D can be decimated, which can reduce the dimension of $W_p$ and $d_p$ in applying equation (17) to compute the parameters.

The model order $L_p$ can be chosen by a hypothesis test using the following null and alternative hypotheses $H_0$: (18a)
$a_{0,p} = a_{1,0,p} = a_{1,1,p} = a_{2,0,p} = \ldots = a_{1,k,p} = 0$, $H_1$: (18b)
$\exists\, a_{l,k,p} \neq 0$.

A test statistic is required for a hypothesis test, such as a wald-type test, t-test, Chi-square test and etc., as described in K. Mardia et al., *Multivariate Analysis*, Academic Press, 1980.

FIG. 5 shows the data structure of the kernel representation, which is made up of an overhead and kernel parameters. As the overhead and kernel parameters are numbers, they can be converted to a binary format for storage in a digital system or transmitted through a communication channel, such as the computer network. The size of the converted data structure can be determined by counting the number of binary digits or bits. The number of bits required for storing the data structure of the kernel representation is $$\text{bits for kernel data structure} = \text{overhead} + B_p\left(\sum_{l=1}^{L} P_l \beta_l\right), \quad (19)$$

where $B_p$ is the number of bits per kernel parameter and $\beta_l$ are the number of parameters for a kernel with order l and $P_l$ is the number of kernels with order l and $$\sum_{l=1}^{L} P_l = P.$$

The number of parameters $\beta_l$ for a kernel $K_p$ is determined from the following recurrence relationship $\beta_l = \beta_{l-1} + l + 1$, $\beta_1 = 3$, $l=1, 2, \ldots L$. The recurrence relationship can be expressed as $$\beta_l = (l+1)(l+2)/2. \quad (20)$$

The compression rate (CR) is defined as the ratio between the number of bits required to store the original image deformation matrix D and the total bits required to store the data structure of the kernel representation, which is given as $$CR = \frac{\text{bits for storing } D}{\text{bits for kernel data structure}} = \frac{\text{bit per pixel} \times M \times N}{\text{overhead} + B_p\left(\sum_{l=1}^{L} P_l \beta_l\right)}. \quad (21)$$

The amount of overhead depends on the chosen support and order. Three different choices of the support and order are proposed: 1.) Fixed support, 2.) Vertical Split/Merge support and 3.) Horizontal Split/Merge support.

Among the three different choices, the simplest form is a fixed support kernel with a rectangular shape, which is shown in FIG. 2a. FIG. 6 shows the data structure for the fixed support kernel in FIG. 2a. The overhead contains F/V, $P_x$, $P_y$, $h_{x,p}$, $h_{y,p}$, which are the indicator for fix/variable support, the number of kernels per column, number of kernels per row, kernel bandwidth/support in the x-direction and kernel bandwidth/support in the y-direction, respectively. $P = P_x \times P_y$. The kernel order $L_p$ for the $p=1, 2, \ldots, P$-th kernel are also included. The overhead can be obtained as overhead$=B_{FV}+B_{px}+B_{py}+B_x+B_y+B_K+P\times B_L+\beta_L\times B_S$. (22)

where $B_{FV}$, $B_{px}$, $B_{py}$, $B_x$ and $B_y$ are the bits required for storing F/V, $P_x$, $P_y$, $h_{x,p}$ and $h_{y,p}$ and they can be chosen as 16 bit integers. $B_K$ is the number of bit required to store the number of bit per kernel $B_p$. $B_L$ is the number of bits required for storing a maximum order $L=\max(L_p)$. $B_L=$ceil $(\log_2(L))$, where ceil( ) is the ceiling operator. $B_S$ is the number of bits required to store the scaling parameter for fixed-point computation. Since each kernel parameter requires a different scaling, there will be totally $\beta_L$ scaling parameter and the total number of bits required is $\beta_L \times B_S$. Suppose the number of kernels is chosen as $P=P_x \times P_y=256$, the bit per kernel parameters is chosen $B_p=6$ and the kernel order is fixed at L=2. $B_s$ is chosen as $B_s=22$. The CR is given as $$CR = \frac{\text{bit per pixel} \times M \times N}{B_{FV} + B_{Px} + B_{Py} + B_x + B_y + P(B_L) + \beta_L \times B_s + B_p\left(\sum_{l=1}^{L} P_l \beta_l\right)} = \quad (23)$$

$$\frac{8 \times 1920 \times 1080}{1 + 16 + 16 + 16 + 16 + 256(1) + 6 \times 22 + 6(256 \times 6)} \approx 1715$$

The total number of bits for storing the image deformation for a 1080p 30 fps video is only 9668×30≈290 kbps using the above data structure. In general, the compression ratio can be even higher if the kernel order L is allowed to vary between 1 and 2. The compression quality is usually evaluated in terms of signal-to-noise ratio (SNR)

$$SNR = 20 \log_{10}\left(\frac{\text{signal}}{\text{approximation error}}\right) = \quad (24)$$

$$20 \log_{10}\left(\frac{d(x,y)}{d(x,y) - \sum_{p=1}^{P} w_{p,x,y} K_p\left(\frac{x - c_{x,p}}{h_{x,p}}, \frac{y - c_{y,p}}{h_{y,p}}\right)}\right).$$

Using the above configuration, the kernel representation is able to achieve a compression quality of SNR=21.47 dB.

Image deformation may contain discontinuities. In order to improve the compression quality at these regions, the image deformation with vertical discontinuities can be represented using the kernel representation of vertical split/merge variable support, in which the vertical support is set to be longer than that of the horizontal support, i.e. $h_{y,p} > h_{x,p}$, and the support is allowed to vary, as shown in FIGS. 4a and 4b. In particular, the following choice is available, which is referred to as the vertical split/merge mode, and is defined as $$h_{x,p} = \begin{cases} 2h_x & \text{No dis-continuity detected and three neighbor kernels and } Kp \text{ have } L_p = 1 \\ 1/4h_x & \text{Dis-continuity detected and those on the left are significantly larger,} \\ 1/2h_x & \text{Dis-continuity detected} \\ 3/4h_x & \text{Dis-continuity detected and those on the right are significantly larger,} \\ 1 & \text{otherwise.} \end{cases} \quad (25)$$

and $$h_{y,p} = \begin{cases} 2h_y & \text{No dis-continuity detected and three neighbor kernels and } Kp \text{ have } L_p = 1 \\ 1/2h_y & \text{Dis-continuity detected} \\ 1 & \text{otherwise} \end{cases} \quad (26)$$

where $h_{y,p}=2h_{x,p}$. A discontinuity detection test can be performed to identify whether the region $\{x \in [c_{x,p}-h_{x,p}, c_{x,p}+h_{x,p}], y \in [c_{y,p}-h_{y,p}, c_{y,p}+h_{y,p}]\}$ has sufficient discontinuity. FIG. 7 shows the data structure of the kernel representation with variable support, which is similar to the fixed support counterpart shown in FIG. 6 except that the order L in the overhead is now replaced by mod $e_p$, which store the type of chosen $h_{x,p}$ and $h_{y,p}$:

$$mode_p = \begin{cases} 0 & h_{x,p} = h_x, h_{y,p} = h_y, L_p = 1, \text{ (normal)}, \\ 1 & h_{x,p} = h_x, h_{y,p} = h_y, L_p = 2, \text{ (normal)}, \\ 2 & h_{x,p} = 2h_x, h_{y,p} = 2h_y, L_p = 1, \text{ (merge)}, \\ 3 & h_{x,p} = h_x/2, h_{y,p} = h_y/4, L_p = 2, \text{ (split)}, \\ 4 & h_{x,p} = h_x/2, h_{y,p} = h_y/2, L_p = 2, \text{ (split)}, \\ 5 & h_{x,p} = h_x/2, h_{y,p} = 3h_y/4, L_p = 2, \text{ (split)}, \end{cases} \quad (27)$$

In this choice, the model order is allowed to vary only in the normal mode. Whereas in the merge mode and the split mode, the model orders are fixed to $L_p=1$ and $L_p=2$ respectively. This is to reduce the number of bits in the overhead. Since $L_p$ will always equal to 1 when the merge mode as in equations (25) and (26), it is unnecessary to reserve a mode for $L_p=2$ for the merge mode. On the other hand, a motivation in using the split mode is to improve the approximation quality of the kernel representation at the discontinuity. Hence, it is reasonable to use the higher order, i.e. $L_p=2$, in the kernel order. FIG. 8a. shows the variable support of the vertical split/merge mode.

The difference between the horizontal split/merge mode and the vertical split/merge mode is in the choice of $h_{x,p}$ and $h_{y,p}$. Rather than $h_{y,p}=2h_{x,p}$, we choose $h_{x,p}=2h_{y,p}$ and $$h_{y,p} = \begin{cases} 2h_y & \text{No dis-continuity detected and three neighbor kernels and } Kp \text{ have } L_p = 1 \\ 1/4h_y & \text{Dis-continuity detected and those at the top are significantly larger,} \\ 1/2h_y & \text{Dis-continuity detected} \\ 3/4h_y & \text{Dis-continuity detected and those at the bottom are significantly larger,} \\ 1 & \text{otherwise.} \end{cases},$$

$$h_{x,p} = \begin{cases} 2h_x & \text{No dis-continuity detected and three neighbor kernels and } Kp \text{ have } L_p = 1 \\ 1/2h_x & \text{Dis-continuity detected} \\ 1 & \text{otherwise} \end{cases},$$

and the data structure of the kernel representation follows the vertical split/merge mode. FIG. 8b shows the variable support of the vertical split/merge mode.

A distinctive advantage of this invention is its ability to perform inter-coding, i.e. to perform (inter-frame) and/or over space (inter-view) prediction under changes such as camera position, etc. and code only the required motion parameters and new overlay layers in kernel representation. For example, one may first compensate the global deformation such as camera motion position of the background layer $D_{J+1}$ from time t to time t+1 using some global camera compensation method. The deformation model can be an affine model or the general projective transformation. Afterwards, major motion objects and their location deformation parameters can be detected. If the motion compensation is satisfactory, the resulting parameters can be compressed using entropy coding. For areas where local motion compensation are unsatisfactory, it can be coded another as an overlaying layer in kernel representation. This is applicable to inter-view deformation across different camera views as well as over time in prediction across successive image frames over time. Using these motion descriptors and the new layer of kernel representation of time t, the kernel representation at time t+1 can be reconstructed. Given the number of global motion parameters and that the local motion descriptors can be smaller than coding all the deformation kernel parameters, the compression ratio can be significantly increased if the images can be well predicted by the global and local motion parameters.

In the fixed support mode, the kernel order $L_p=1$ and $L_p=2$ can be represented as 0 and 1 respectively. A lossless compression technique, such as an entropy coding method can be used to further compress the kernel order. Whereas in the variable support mode, mod $e_p$ can be further compressed using a lossless compression technique.

In the present invention, a new variable scale differential category based coding technique is used to further compress the kernel parameters. First, the kernel parameters are scaled to fixed-point integers using the scaling parameters $$\bar{a}_{l,k,p} = \text{round}(s_{l,k} \times a_{l,k,p}), \quad (28)$$

where $s_{l,k}$ is a global scaling parameter employed for the k-th parameter of the l-th kernel order. $\bar{a}_{l,k,p}$ is the quantized parameter and it is a signed integer range from $-2^{(B_p-1)}$ to $2^{(B_p-1)}$, where $B_p$ is the chosen bit per kernel parameters. Round( ) is the round-off operator. The round-off procedure in equation (28) is also referred to as quantization. After the kernel parameters have been scaled and quantized, they can be further compressed using the proposed differential category coding. The principle of category coding is to group the parameters according to their number of binary digits. Since parameters in most categories do not require $B_p$ bits, the data rate can be reduced. More precisely, a category table is constructed for the parameters, which is defined as Category 0: $a_{l,k,p}=0$, (29a)

Category 1: $1 \leq |a_{l,k,p}| \leq 2^{q_r}-1$, (29b)

Category r: $2^{q_r-1} \leq |a_{l,k,p}| \leq 2^{q_r}-1, r=1,2,\ldots,R$, (29c)

where R is the total number of categories, $B_p$ is the number of bit per kernel parameter (including sign bit) defined in equation (22), $q_r$ is the number of binary digits of the kernel parameter represented by category r (excluding sign bit). $q_r$ can be chosen as $$q_r = \begin{cases} 1 & r=0 \\ B_p-1 & r=R \\ rQ & \text{otherwise} \end{cases}, \text{ where } Q = \text{floor}\left(\frac{B_p-1}{R}\right), \quad (30)$$

$r=1,2,\ldots,R-1$.

Here, Q is the difference of binary digits between adjacent categories for category $r=1, 2, \ldots, R-1$. Since Q can be varied by choosing a different R, this can be referred to as a variable scale. For example, if $B_p=21$ (including sign bit) and the total number of categories R=6 are chosen, then the number of binary digits required to store the kernel parameter (excluding sign bit) of category $r=0, 1, 2, \ldots 6$ is $q_r=1, 3, 6, 9, 12, 15$ and 20 respectively. The scale Q can be chosen to optimize the compression ratio.

In the proposed variable scale differential category coding, the statistical redundancy in the occurrence of the category can be exploited. FIG. 8 shows the procedure of the proposed differential category coding. First, all the kernel parameters are divided into chunks of V parameters. In each chunk, the first kernel parameter is treated as a reference parameter. The category of the reference parameter is stored as the symbol ref. Afterwards, the categories of all L parameters are obtained from the category table. In this example, Q is chosen as Q=2. At the same time, we also detect whether there is a difference between the sign of the reference parameter and other remaining parameters, the pattern of which is represented using the symbol isSign. Afterwards, a symbol isDiff is used to represent whether there is difference in category between the reference parameter and other parameters. Finally, for the parameters belonging to categories different from the reference parameter, we compute the actual difference in category and a symbol Diff is used to store the difference for each of the parameter. Note, only parameters with the same category as the reference are omitted. As a result, only three symbols are required as shown in FIG. 9.

Figure 9:
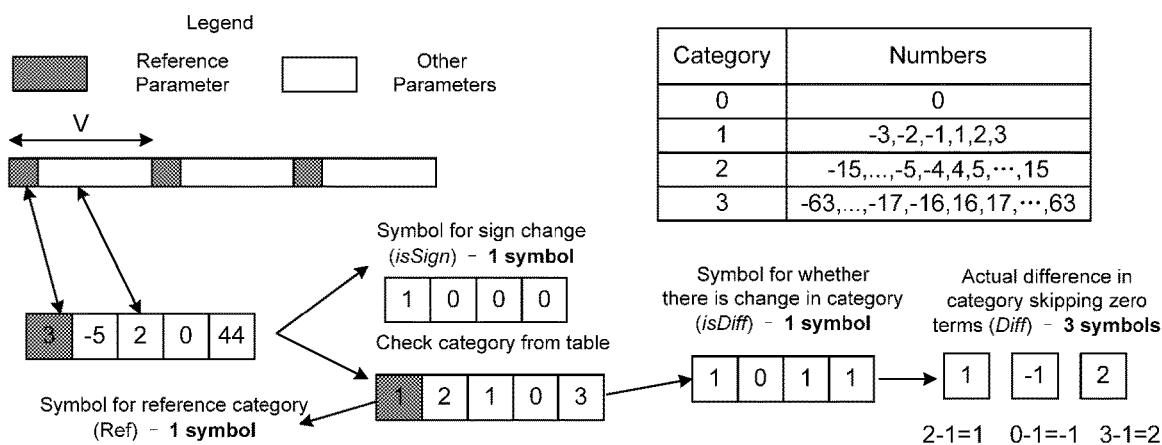
FIG. 9 shows the procedure for differential category coding for Q=2 according to the present invention.

FIG. 9 shows the procedure of Differential Category Coding for Q=2. The total number of symbols for coding the category for the above chunk is symbols. These symbols can be further compressed using entropy coding techniques such as arithmetic coding or Huffman coding. If such techniques are employed, the dictionaries for the symbols Ref, is Diff and Diff are required and they may be included as part of the overhead in the data structure shown in FIG. 4 when an update of the dictionaries are performed, say once per 30 to 60 frames. As an illustration, this example considers a signed representation, in which code the redundancy of the sign bit can be further coded using isSign. In general, other representations, such as one's complement, two's complement and etc. can also be used.

FIG. 10 shows the data structure for the proposed differential category coding scheme. Apart from the symbols mentioned above, the total number of kernel parameters $P_L$ for order L is also stored/transmitted. Since $P_L$ may not be divisible by the length of each chunk V, the whole set of parameters is padded with zeros in the final chunk. Hence, the padding length has to be stored/transmitted. The storage of Q is also required. Since $B_p$ is stored/transmitted in the global overhead as shown in FIG. 4, R can be calculated using Q and $B_p$ as in equation (30) and the storage of R is not required. The data stream in FIG. 10 contains the actual binary values of the kernel parameters represented by the category coding and its total length will be smaller than that of the total stream of uncompressed kernel parameters when some of the kernel parameters belong to categories r<R. The total size of the data stream is $$\text{Total size of data stream} = \sum_{u=1}^{U} \sum_{v=1}^{V} q_{r,v}, \quad (31)$$

where U is the total number of chunks. The symbols isDiff, Diff, isSign and ref can be further compressed using entropy coding techniques such as arithmetic coding or Huffman coding. See, S. E. Umbaugh, *Digital image processing and analysis: human and computer vision applications with CVIPtools* (2nd ed. ed.), Boca Raton, Fla.: CRC Press, 2010, which is incorporated herein by reference in its entirety. To further increase the compression ratio for some data with high redundancy in the kernel parameter, the kernel parameters may be subtracted from the reference parameter and only the residual is coded.

The word length of the kernel parameter can be determined by the specified compression quality, such as the required precision of image deformation, tolerance of the approximation error, and etc. For example, the required range and precision of the image deformation can be specified, and the number of bits required for kernel parameter can be calculated. Alternatively, an iterative procedure may be employed to evaluate the quantization error for different chosen word lengths and the appropriate one may be chosen with least approximation error among the subset of acceptable word lengths. This concept can be applied to different number representations, such as signed representation, one's complement, two's complement, etc.

For example, consider a polynomial kernel with order 2 with parameters represented using a signed representation, i.e. $K_p(x,y,a_p)=a_{0,p}+a_{1,0,p}x+a_{1,1,p}y+a_{2,0,p}x^2+a_{2,1,p}xy+a_{2,2,p}y^2$.

Suppose $K_p(x,y,a_p)$ is a positive integer with 8 integer bits, x and y are the positive integer coordinates within the support and it ranges from $[c_{x,p},c_{x,p}+h_{x,p}]$ and $[c_{y,p},c_{y,p}+h_{y,p}]$ respectively. The word length of x and y are hence determined by the size of $h_{x,p}$ and $h_{y,p}$. For example, it can be chosen as $\text{ceil}(\log_2(\max(h_{x,p},h_{y,p})))$ and $2\times\text{ceil}(\log_2(\max(h_{x,p},h_{y,p})))$ for a fixed support kernel and variable support kernel, respectively. The kernel parameters $a_{i,j,p}$ are floating point numbers and the required word length for storing the floating point number is to be determined. Suppose $a_{i,j,p}$ has $\xi_a$ integer bits and $\delta_a$ decimal bits and the total no. of bits are $\theta_a$ bits, i.e. $\theta_a=1+\xi_a+\delta_a$ (including sign bit). $a_{i,j,p}$ can be represented as $$sb_\xi b_{\xi-1}\ldots b_0\cdot b_{-1}b_{-2}\ldots b_\delta, \quad (32)$$

where bit s is the sign bit and bit $b_k$ has a weight of $2^k$. The number in equation (32) can be expressed as $$a_{i,j,p}=(1/2^\delta)\sum_{n=0}^{\xi+\delta}2^n b_n. \quad (33)$$

The signed representation is denoted with $\xi_a$ integer bits and $\delta_a$ decimal bits in equation (33) as $S(a_{i,j,p},\xi_a,\delta_a)$. Since x and y are positive integer coordinates, their signed representation are $S(x,\xi_x,0)$ and $S(y,\xi_y,0)$ respectively. Let $d_{i,j,p}$ be the product of $a_{i,j,p}$ and x, i.e. $d_{i,j,p}=a_{i,j,p}x^i y^j$, and its signed representation be $S(d_{i,j,p},\xi_d,\delta_d)$. $S(d_{i,j,p},\xi_d,\delta_d)$ is given as $$S(d_{i,j,p},\xi_d,\delta_d)=S(a_{i,j,p},\xi_a,\delta_a)\times(S(x,\xi_x,0))^i\times(S(y,\xi_y,0))^j. \quad (34)$$

where $\xi_d=\xi_a+i\xi_x+j\xi_y$ and $\delta_d=\delta_b$ and $\theta_d=1+\xi_d+\delta_d$. The total number of bits required to store the sum of all products for $K_p(x,y,a_p)=a_{0,p}+a_{1,0,p}x+a_{0,1,p}y+a_{2,0,p}x^2+a_{1,1,p}xy+a_{0,2,p}y^2$ will be $$\max_{i,j,p}(\xi_{d,i,j,p})+\max_{i,j,p}(\delta_{d,i,j,p})+2,$$

in which 2 extra bits are allocated for sign and carry bits. Since $K_p(x,y,a_p)$ is of finite word length $\theta_K$, the number of integer bits $\xi_K$ and decimal bits $\delta_K$ can be expressed as $$\xi_K=\max_{i,j,p}(\xi_{d,i,j,p})+1, \quad (35a)$$

$$\delta_K=\max_{i,j,p}(\delta_{d,i,j,p}), \text{ and} \quad (35b)$$

$$\theta_K=\xi_K+\delta_K+1. \quad (35c)$$

To optimize the precision of $a_{i,j,p}$, the following may be employed:

$$\xi_{d,0,p}=\xi_{d,1,0,p}=\xi_{d,0,1,p}=\xi_{d,2,0,p}=\xi_{d,1,1,p}=\xi_{d,0,2,p}=\xi_K-1, \text{ and} \quad (36a)$$

$$\xi_{d,0,p}=\xi_{d,1,0,p}=\xi_{d,0,1,p}=\xi_{d,2,0,p}=\xi_{d,1,1,p}=\xi_{d,0,2,p}=\delta_K. \quad (36b)$$

Then, the minimum word length for representing the kernel parameters without losing precision is $$a_{0,p}: \theta_{a,0,p}=\xi_{a,0,p}+\delta_{a,0,p}+1, \xi_{a,0,p}=\xi_K-1, \delta_{a,0,p}=\delta_K, \quad (37a)$$

$$a_{1,0,p}x: \theta_{a,1,0,p}=\xi_{a,1,0,p}+\delta_{a,1,0,p}+1, \xi_{a,1,0,p}=\xi_K-\xi_x-1, \delta_{a,1,0,p}=\delta_K, \quad (37b)$$

$$a_{0,1,p}y: \theta_{a,0,1,p}=\xi_{a,0,1,p}+\delta_{a,0,1,p}+1, \xi_{a,0,1,p}=\xi_K-\xi_y-1, \delta_{a,0,1,p}=\delta_K, \quad (37c)$$

$$a_{2,0,p}x^2: \theta_{a,2,0,p}=\xi_{a,2,0,p}+\delta_{a,2,0,p}+1, \xi_{a,2,0,p}=\xi_K-2\xi_x-1, \delta_{a,2,0,p}=\delta_K, \quad (37d)$$

$$a_{1,1,p}xy: \theta_{a,1,1,p}=\xi_{a,1,1,p}+\delta_{a,1,1,p}+1, \xi_{a,1,1,p}=\xi_K-\xi_x-\xi_y-1, \delta_{a,1,1,p}=\delta_K, \quad (37e)$$

$$a_{0,2,p}y^2: \theta_{a,0,2,p}=\xi_{a,0,2,p}+\delta_{a,0,2,p}+1, \xi_{a,0,2,p}=\xi_K-2\xi_y-1, \delta_{a,0,2,p}=\delta_K. \quad (37f)$$

On the other hand, if a lossy compression is allowed, the different word lengths may be specified and compared with the reconstruction error given as $$\sum_{x,y}d(x,y)-\sum_p K_p(x,y,\bar{a}_p),$$

where $\bar{a}_p$ are the quantized kernel parameters. Then the best word length is chosen that gives the smallest reconstruction error.

The encoded data for an image deformation map received at the decoder will be either in the two formats as shown in FIGS. 6 and 7, which are the data structure for the fixed and variable support modes, respectively. The decoding procedure is summarized as follows:

1. Read the first bit (F/V) of the encoded data, where 0 and 1 indicate fixed support and variable support modes, respectively.
2. Read $P_x$, $P_y$, $h_x$ and $h_y$, which are all unsigned 16 bit integers and that represent the number of kernels per column, number of kernels per row, the width and height of the image deformation map respectively.
3. Starting from the first kernel with center location (0,0), generate or compute the center location of the subsequent kernel by adding its support $h_x$ and $h_y$. For a fixed support, the kernels can be labeled using $K_{i,j}$, where i=1, 2, . . . , $P_x$ and j=1, 2, . . . $P_y$ indicate the column and row number. $h_{x,p}=\text{floor}(h_x/P_x)$ and $h_{y,p}=\text{floor}(h_y/P_y)$ can be chosen for i<$P_x$−1 and j<$P_y$−1. Otherwise, they can be chosen as $h_{x,p}=(h_x-(P_x-2)h_{x,p})/2$ and $h_{y,p}=(h_y-$ $(P_y-2)h_{y,p})/2$. Whereas in the variable support mode, the above fixed kernel support can be generated first. Afterwards, read the mode parameters mod $e_p$ sequentially, which are labeled in column-major ordering. When mod $e_p=2$ is read, merge the support of the current and the subsequent kernel. If mod $e_p=3$, 4, or 5, it is necessary to determine whether the variable support is in vertical or horizontal split/merge mode by comparing $P_x$ and $P_y$. If $P_x > P_y$, then the vertical split/merge mode is chosen or vice versa. Then, choose the appropriate bandwidth/support $h_{x,p}$ and $h_{y,p}$ by applying the formulas 25 and 26.

4. After generating the center locations, the displacement and transparent values can be decoded as follows $$\bar{d}_j(x, y) = \sum_{p=1}^{P_j} w_{p,x,y,j} K_{p,j}\left(\frac{x - c_{x,p,j}}{h_{x,p,j}}, \frac{y - c_{y,p,j}}{h_{y,p,j}}, a_{p,j}\right), \quad (38a)$$

$$\bar{\alpha}_j(x, y) = \sum_{p=1}^{P_j} w_{\alpha,p,x,y,j} K_{p,j}\left(\frac{x - c_{x,p,j}}{h_{x,p,j}}, \frac{y - c_{y,p,j}}{h_{y,p,j}}, a_{\alpha,p,j}\right), \quad (38b)$$

where $K_{p,j}(\cdot)$ is the kernel function defined as in equation (4). Since the kernel parameters have been scaled and quantized before they are coded, a re-scaling is required before applying them to equations (22a) and (22b) for decoding $$\tilde{a}_{l,k,p} \times \bar{a}_{l,k,p} \cdot 2^{-s_{l,k}}, \quad (39)$$

where $\bar{a}_{l,k,p}$ is the quantized and scaled parameter and $\tilde{a}_{l,k,p}$ is the re-scaled parameter, which is applied to equations. (38a) and (38b) for reconstruction. Equation (39) can be performed by shifting $s_{l,k}$ bits of $\bar{a}_{l,k,p}$ to the right. The decoding processes in (38a) and (38b) are done with integer multiplications in 16 bit arithmetic. To avoid the divisions $$\frac{x - c_{x,p,j}}{h_{x,p,j}} \text{ and } \frac{y - c_{y,p,j}}{h_{y,p,j}}$$

in Eqns. (38a) and (38b), the two quantities can be pre-computed as follows $$\frac{x - c_{x,p,j}}{h_{x,p,j}} = 0, \frac{1}{h_{x,p,j}}, \dots, 1, \text{ for } x = [c_{x,p,j}, c_{x,p,j} + h_{x,p,j}], \quad (40a)$$

$$\frac{y - c_{y,p,j}}{h_{y,p,j}} = 0, \frac{1}{h_{y,p,j}}, \dots, 1, \text{ for } y = [c_{y,p,j}, c_{y,p,j} + h_{y,p,j}]. \quad (40b)$$

Afterwards, the computation of $$K_{p,j}\left(\frac{x - c_{x,p,j}}{h_{x,p,j}}, \frac{y - c_{y,p,j}}{h_{y,p,j}}, a_{p,j}\right)$$

can be performed in 16 bit fixed-point arithmetic.

The procedure to decode the compressed kernel parameters is as follows:

The structure of the encoded kernel parameters is shown in FIG. 9. The decoding procedure can be summarized as follows:

1. Read $P_L$, pad length, and Q, which are 16 bit, 16 bit and 8 bit unsigned integers respectively.
2. Read the symbols isDiff, Diff, Ref and IsSign. If they are compressed say using entropy methods, the total number of bits required to store each of the symbols will be included at the beginning of the symbols. Hence, these symbols can be de-compressed using their respective dictionaries, which are sent over say once per 30 to 60 frames.
3. Decode the first chunk/block. Read the first symbol in the de-compressed isDiff, which contains all the symbols for indicating whether there is change in category for each of the kernel parameters. A isDiff symbol contains V−1 bits, which represents the indicator for parameters v=2, 3, ..., V.
4. Create v=1, 2, ... V variables for storing the categories for the V parameters. For each of the variables v=2, 3, ... V, if the v-th bit of the isDiff symbol is 1, read a symbol from Diff, add the difference to the v-th variable. Read the first Ref symbol, add the reference category to each of the v-th variable. Save the 1$^{st}$ variable as the reference category.
5. After obtaining the categories for the V parameters, obtain the word length of each of the parameters as in equation (20). Afterwards, read the V parameters from the data-stream in accordance with to the obtained word lengths.
6. Repeat steps 2-5 for subsequent chunks/blocks.

The compression standard supports two modes of operation: 1.) Compression of 3D content such as single-view image, depth maps, stereo images, full-frame two-view images and two view depth maps. 2.) Compression of description parameters. Tables 1 and 2 summarizes the input and output format of the encoder and decoder respectively. In particular, the description parameters may be used to describe the kernel parameters for representing the depth values, transparency or opacity. The data structure of the description parameters are shown in FIG. 10. If the input contains only image, the image deformation map will be obtained by a depth estimation method.

TABLE 1

Input and output format supported for the encoder.

| No. of Input Views | Input Format | Output Format |
|---|---|---|
| Mode 0 (Compression of 3D content) | | |
| 1 | Single-view image | Description Parameters A 8-16 bit per pixel depth map |
| 1 | A 8-16 bit per pixel depth map | Description Parameters A 8-16 bit per pixel depth map |
| 2 | Stereo Image (side by side) | Description Parameters A 8-16 bit per pixel depth map |
| 2 | Full frame Two-view Image | Description Parameters A 8-16 bit per pixel depth map |
| 2 | Two 8-16 bit per pixel depth map | Description Parameters (2 sets) |
| Model 1 (Compression of description parameter) | | |
| 1 | Single set of description parameters | Compressed parameters A 8-16 bit per pixel depth map |
| 2 | Two sets of description parameters, each of which describes a view of the stereo image. | Two sets of compressed parameters Two 8-16 bit per pixel depth map |

TABLE 2

Input and output format for the Decoder.

| No. of Input Views | Input Format | Output Format |
|---|---|---|
| Mode 0 (De-compression of 3D content) | | |
| 1 | Compressed parameters | A 8-16 bit per pixel depth map |
| 2 | Two sets of compressed parameters | Two 8-16 bit per pixel depth map |
| Mode 1 (De-compression of description parameters) | | |
| 1 | Compressed parameters | Description Parameters for a depth map |
| 2 | Two sets of compressed parameters | Two sets of description parameters for two depth maps |

The disadvantage of the image deformation representation in the image domain warping method of the prior art is that since each pixel is assigned a depth value, the data size of such representation can increase substantially for a HD 3D video content, which may lead to large latency in 3DTV broadcasting. Moreover, it does not contain inter-coding. Since only a single deformation value is assigned for each particular location, the image domain warping method cannot handle the view synthesis of semi-transparent, reflective or deformable objects.

The aadvantages of the multi-layer Variable Support and Order Kernel-based Representation for Image Deformation:
  i. It reduces significantly the data rate for transmission/storage of the image deformation.
  ii. Allows multiple overlays and varying transparency of image deformation. Hence, it is able to handle semi-transparent, reflective or deformable objects.
  iii. The shape information of the image deformation can be further compressed using a shape codec and it can be used to further sharpen the image deformation.
  iv. It improves the smoothness of the image deformation.
  v. It provides the flexibility in controlling the compression ratio and quality.
  vi. The ability to perform inter-coding, which leads to further improved compression ratio.
  vii. Efficient schemes for computing the kernel parameters, which facilitates real-time view synthesis in say an android-based 3D display device.

The advantages of the Variable Scale and Differential Category Coding for Compression of Kernel Parameters are:
  i. The ability to determine the word length according to the specified compression quality. This provides more flexibility in controlling between the compression ratio and quality.
  ii. Rather than simply predicting the values of the kernel parameters, which could hardly be accurate in the context of approximating the image deformation, this invention predicts the categories of the kernel parameters and code the scale and sign difference. As a result, it is able to explore the redundancies in scale and sign of the parameters to achieve better compression ratio.
  iii. A variable scale is employed to form the category coding and a new method to optimize the scale is proposed and it is able to achieve a high compression ratio and a satisfactory compression quality.

The proposed invention is expected to have great impact in the field of 3D video content provision. One immediate application of the invention is the 3D video content compression for online video broadcasting. Another application is 3D video format conversion.

The algorithm can be included in a compression standard proposal for autostereoscopic multi-view TVs.

Different 3D video content provision service and related products can be developed, such as 3D video broadcasting service, 3D video format conversion software or hardware, 3D video compression software or hardware, and etc.

While the invention has been particularly shown and described with reference to preferred embodiments thereof, it will be understood by those skilled in the art that various changes in form and details may be made therein without departing from the spirit and scope of the invention. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all implementations falling within the scope of the appended claims, and equivalents thereof.

What is claimed:

1. A method of representing image deformation information for broadcast and/or storage, comprising the steps of:
  representing image deformation information in the form of depth maps as a function of multiple kernels that can overlay each other and have support and order, wherein objects and background are assigned to different overlays; and
  using variable scale and differential category coding for compression of parameters of the kernels; and
  using inter-frame and/or over space prediction under changes in the position of a camera that generated the deformation information so that the method codes only the required camera compensation model and motion descriptors, predicts the scale and the sign of the kernel parameters, and codes the scale and sign difference.

2. The method of claim 1 wherein type, order and support of the kernel may be varied across different regions of the deformation, and the deformation is approximated in terms of the parameters of the kernel.

3. The method of claim 1 wherein the overlay of different objects with large depth difference is handled by considering multiple layers of the representation, in which the kernel representation of occluded objects can be approximated by inpainted data.

4. The method of claim 1 wherein the coding includes inter-coding, in which a sequence of image deformations can be coded using a reference kernel representation, a global camera compensation model or motion descriptors.

5. The method of claim 1 wherein the coding uses algorithms that focus on encoding the redundancies among integers or fixed-point numbers.

6. A method of decoding image deformation information encoded according to claim 1 into a data structure that includes overhead (in the form of an indicator of fix/variable support F/V, the number of kernels per column Px, number of kernels per row Py, kernel bandwidth/support in the x-direction hx,p and kernel bandwidth/support in the y-direction hy,p, scaling parameters and the maximum kernel order Lp or mod $e_p$) followed by the kernel parameters, comprising the steps of:
  (1) reading the pad length PL, and the difference of binary digits between adjacent categories $\underline{Q}$;
  (2) reading the symbols $^{isDiff}$, $^{Diff}$, Ref and $^{IsSign}$, if they are compressed, decompress them using their respective dictionaries;
  (3) decoding the first chunk/block by reading the first symbol in the de-compressed $^{isDiff}$, which contains all the symbols for indicating whether there is change in category for each of the kernel parameters;

(4) creating $v=1, 2, \ldots V$ variables for storing the categories for the $V$ parameters, for each of the variables $v=2, 3, \ldots V$, if the $v$-th bit of the $isDiff$ symbol is 1, read a symbol from $Diff$, adding the difference to the $v$-th variable;

reading the first Ref symbol, add the reference category to each of the $v$-th variable and save the $1^{st}$ variable as the reference category;

(5) after obtaining the categories for the $V$ parameters, obtaining the word length of each of the parameters and then reading the $V$ parameters from the data-stream in accordance with the obtained word lengths; and (6) repeating steps (2)-(5) for subsequent chunks/blocks.

7. A method of representing image deformation information for broadcast and/or storage, comprising the steps of:
representing the image deformation as a function of multiple kernels that can overlay each other and have support and order, wherein objects and background are assigned to different overlays;
using variable scale and differential category coding for compression of parameters of the kernels; and
wherein the support can be in any arbitrary shape, such as rectangles, parallelograms or polygons; the topological space represented by the support can be connected or disconnected; and the support can be fixed or variable.

8. The method of claim 7 wherein, in the fixed support mode the kernel order $L_p=1$ and $L_p=2$ can be represented as 0 and 1 respectively, and further using a lossless compression technique, such as an entropy coding method, to further compress the kernel order; and
in the variable support mode, further compressing $mode_p$ using a lossless compression technique.

9. A method of representing image deformation information for broadcast and/or storage, comprising the steps of:
representing the image deformation as a function of multiple kernels that can overlay each other and have support and order, wherein objects and background are assigned to different overlays;
using variable scale and differential category coding for compression of parameters of the kernels; and
wherein the representations can be matted together to form a multi-overlay representation, and opacity can be incorporated in each different overlay representation to support semi-transparency and reflective applications.

10. A method of representing image deformation information for broadcast and/or storage, comprising the steps of:
representing the image deformation as a function of multiple kernels that can overlay each other and have support and order, wherein objects and background are assigned to different overlays;
using variable scale and differential category coding for compression of parameters of the kernels; and
wherein the support and order are in fixed support, vertical split/merge support or horizontal split/merge support.

11. A method of representing image deformation information for broadcast and/or storage, comprising the steps of:
representing the image deformation as a function of multiple kernels that can overlay each other and have support and order, wherein objects and background are assigned to different overlays;
using variable scale and differential category coding for compression of parameters of the kernels; and
wherein the kernel parameters can be efficiently computed using a multiplier-less maximum likelihood approach, which can be executed sequentially or in parallel.

12. A method of representing image deformation information for broadcast and/or storage, comprising the steps of:
representing the image deformation as a function of multiple kernels that can overlay each other and have support and order, wherein objects and background are assigned to different overlays;
using variable scale and differential category coding for compression of parameters of the kernels; and
wherein the objects in the foreground are segmented from the image deformation, then the image deformation at each of the objects is represented by a different overlay of kernel representation, and then the remaining background is represented by another layer of kernel representation.

13. A method of representing image deformation information for broadcast and/or storage, comprising the steps of:
representing the image deformation as a function of multiple kernels that can overlay each other and have support and order, wherein objects and background are assigned to different overlays;
using variable scale and differential category coding for compression of parameters of the kernels; and
wherein the coding includes inter-coding, which is to perform inter-frame and/or over space (inter-view) prediction under changes (such as camera position) and code only the required motion parameters and new overlay layers in kernel representation.

14. The method of claim 13 including the step of compensating for global deformation, such as camera motion position of the background layer from time to time,. using a global camera compensation method.

15. The method of claim 14 wherein the deformation model is an affine54 model or a general projective transformation, and further including the steps of:
detecting major motion objects and their location deformation parameters;
if the motion compensation is satisfactory, compressing the resulting parameters using entropy coding;
for areas where local motion compensation is unsatisfactory, coding another overlaying layer in the kernel representation; and
using the motion descriptors and the new layer of kernel representation at time t, to reconstruct the kernel representation at time t+1.

16. A method of representing image deformation information for broadcast and/or storage, comprising the steps of:
representing the image deformation as a function of multiple kernels that can overlay each other and have support and order, wherein objects and background are assigned to different overlays;
using variable scale and differential category coding for compression of parameters of the kernels; and
wherein the variable scale and differential category coding comprises the steps of:
scaling the kernel parameters to fixed-point integers;
performing quantization of the integers;
further compressing the numbers using differential category coding whereby the parameters are grouped according to their number of binary digits according to a category table; and
determining the difference of binary digits between adjacent categories.

17. The method of claim 16 wherein the variable scale differential category coding comprises the steps of:
dividing all of the kernel parameters into chunks of V parameters;

treating the first kernel parameter in each chunk as a reference parameter;

storing the category of the reference parameter as the symbol $^{ref}$; pg,34 obtaining the categories of all L parameters from the category table and at the same time, detecting whether there is a difference between the sign of the reference parameter and other remaining parameters, the pattern of which is represented using the symbol $^{isSign}$;

using a symbol $^{isDiff}$ to represent whether there is difference in category between the reference parameter and other parameters; and computing the actual difference in category for the parameters that belong to categories different from the reference parameter and using a symbol $^{Diff}$ to store the difference for each of the parameters.

\* \* \* \* \*